US009454851B2

(12) United States Patent
Guseva

(10) Patent No.: US 9,454,851 B2
(45) Date of Patent: Sep. 27, 2016

(54) EFFICIENT APPROACH TO ESTIMATE DISPARITY MAP

(75) Inventor: Tatyana Guseva, Saint-Petersburg (RU)

(73) Assignee: Intel Corporation, Santa Clara, CA (US)

( * ) Notice: Subject to any disclaimer, the term of this patent is extended or adjusted under 35 U.S.C. 154(b) by 267 days.

(21) Appl. No.: 13/997,039

(22) PCT Filed: Jun. 24, 2011

(86) PCT No.: PCT/RU2011/000451
§ 371 (c)(1),
(2), (4) Date: Mar. 19, 2014

(87) PCT Pub. No.: WO2012/177166
PCT Pub. Date: Dec. 27, 2012

(65) Prior Publication Data
US 2014/0240310 A1    Aug. 28, 2014

(51) Int. Cl.
*G06T 19/20*    (2011.01)
*G06T 7/00*    (2006.01)

(52) U.S. Cl.
CPC ............. *G06T 19/20* (2013.01); *G06T 7/0051* (2013.01); *G06T 7/0075* (2013.01)

(58) Field of Classification Search
CPC .......................................... G06T 2207/20228
See application file for complete search history.

(56) References Cited

U.S. PATENT DOCUMENTS

| 8,737,723 | B1* | 5/2014 | Kwatra | ................ | G06T 7/0075 345/419 |
| 2003/0190072 | A1 | 10/2003 | Adkins et al. | | |
| 2006/0120594 | A1* | 6/2006 | Kim | ........................ | G06K 9/32 382/154 |
| 2010/0142824 | A1* | 6/2010 | Lu | ............................ | G06K 9/32 382/195 |

(Continued)

FOREIGN PATENT DOCUMENTS

WO    2012/177166 A1    12/2012

OTHER PUBLICATIONS

Stereo matching via selective multiple windows, Adhyapak et al., 2007.*

(Continued)

*Primary Examiner* — Jacinta M Crawford
*Assistant Examiner* — Phong Nguyen
(74) *Attorney, Agent, or Firm* — Douglas J. Ryder; Ryder, Lu, Mazzeo & Konieczny LLC

(57) ABSTRACT

An image processing device may include a disparity map estimator, which may perform an iterative technique to improve the efficiency of generating disparity map. The disparity map estimator performs disparity map refinement using varying size aggregation windows during the first iterations. The disparity map estimator uses larger size aggregation windows during the initial iterations to perform disparity map refinement. Further, the disparity map estimator may use joint bilateral up-sampling during the second (or last) iterations. Using a combination of varying size aggregation windows during the initial iterations and a joint bilateral up-sampling during the second iterations may reduce the computational complexity and memory requirements. In one embodiment, the combination of using varying size aggregation windows and joint bilateral up-sampling to refine the disparity map may reduce the high resolution of the images to a level acceptable for real-time processing and may further reduce the number of incorrect matches.

30 Claims, 3 Drawing Sheets

(56) References Cited

U.S. PATENT DOCUMENTS

| | | | | |
|---|---|---|---|---|
| 2010/0220932 | A1* | 9/2010 | Zhang | G06T 7/0075 382/209 |
| 2011/0116706 | A1* | 5/2011 | Baik | G06T 7/0022 382/154 |
| 2011/0176722 | A1* | 7/2011 | Sizintsev | G06T 7/0022 382/154 |
| 2012/0008857 | A1* | 1/2012 | Choi | G06T 7/0022 382/154 |
| 2012/0200669 | A1* | 8/2012 | Lai | G06T 5/002 348/43 |

OTHER PUBLICATIONS

Kanaoe et al., "A Stereo Matching Algorithm With an Adaptive Window: Theory and Experiment", Proceedings of the International Conference on Robotics and Automation Sacramento, Apr. 1991, pp. 1088-1095.

Scharstein et al., "Sampling the Disparity Space Image", IEEE Transactions on Pattern Analysis and Machine Intelligence, vol. 25, Issue No. 3, Mar. 2004, pp. 419-425.

Tomasi et al., "Bilateral Filtering for Gray and Color Image", 6th International Conference on Computer Vision, Jan. 4-7, 1998, pp. 839-846.

Wang et al., "High-Quality Real-Time Stereo Using Adaptive Cost Aggregation and Dynamic Programming", 3D Data Processing, Visualization, and Transmission, © 2006 IEEE, pp. 798-805.

International Search Report and Written Opinion received for PCT Patent Application No. PCT/RU2011/000451, mailed on Jul. 5, 2012, 11 pages.

International Preliminary Report on Patentability and Written Opinion received for PCT Patent Application No. PCT/RU2011/000451, mailed on Jan. 9, 2014, 6 pages.

* cited by examiner

EFFICIENT APPROACH TO ESTIMATE DISPARITY MAP

BACKGROUND

Restoring three dimensional (3-D) information from a stereo image is an important task in 3-D image processing. The basis for stereo image is the fact that a real-world point projects to a unique pair of corresponding pixels in stereo images. As a result, it may be possible to restore 3-D information if the pixels in a left and right image corresponding to the same real-world point are determined. Determining the location of pixels in each camera image that are projection of a same real-world point is, generally, referred to as a correspondence problem. Solving a correspondence problem includes estimation of a disparity map.

The difference in the position of the two corresponding points of the same real-world image in the left and right view images is, generally, referred to as disparity or parallax. A map of disparity in the projection of several real-world points in the left and right image may be referred to as a disparity map. Some techniques to generate disparity map include local, global, and iterative approaches. In a local approach, the estimation of the disparity map depends on the intensity values within a finite window and the computational cost is thus low. On the other hand, the global approaches use non-local constraints to reduce sensitivity to local regions such as occluded and textureless regions and the computational cost of the global approach is thus high compared to the local approach. In between the local and global approaches is the iterative approach. The iterative approaches such as coarse-to-fine techniques, typically, operate on an image pyramid in which the results from the coarser levels are used to define more local search at finer levels. Improving the efficiency of such iterative approaches is therefore important.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 2:
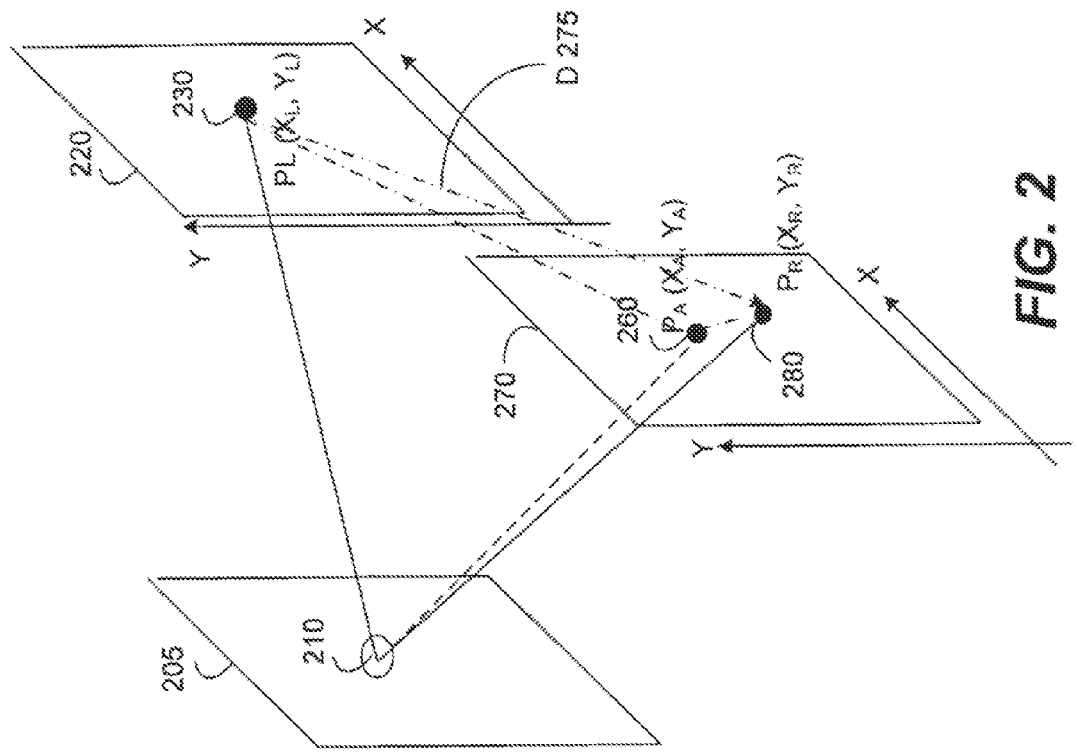
FIG. 2 illustrates a line diagram 200, which depicts the disparity of a projection of the same real-world point in the left and the right image in accordance with one embodiment.

The following description describes an image processor device IPD, which may support iterative techniques to improve efficiency of generating disparity maps. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable storage medium may include any mechanism for storing or transmitting information in a form readable by a machine (e.g., a computing device).

For example, a machine-readable storage medium may include read only memory (ROM); random access memory (RAM); magnetic disk storage media; optical storage media; flash memory devices; electrical, optical forms of signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

In one embodiment, the image processing device may perform an iterative technique to improve the efficiency of generating disparity map. In one embodiment, the image processing device may perform disparity map refinement using size varying aggregation windows during the first (or initial) iterations as compared to, for example, generating low resolution stereo images (from the original image) during the initial iterations. In one embodiment, image processing device may use larger or bigger size aggregation windows during the initial iterations to perform disparity map refinement. Further, the image processing device may use joint bilateral up-sampling during the second (or last) iterations.

In one embodiment, using a combination of varying size aggregation windows during the initial iterations and a joint bilateral up-sampling during the second iterations may reduce the computational complexity and memory requirements. In one embodiment, the combination of using varying size aggregation windows and joint bilateral up-sampling to refine the disparity map may reduce the high resolution of the images to a level acceptable for real-time processing and may further reduce the number of incorrect matches.

Figure 1:
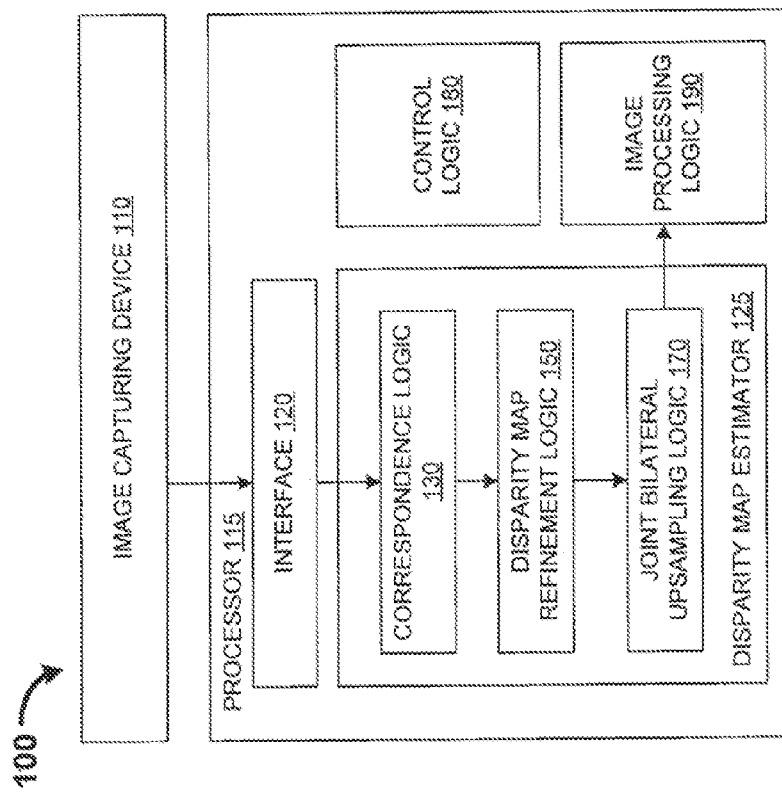
FIG. 1 illustrates a block diagram of an image processing device IPD 100, which may perform iterative techniques to improve efficiency of generating disparity maps in accordance with one embodiment.

An embodiment of an image processing device IPD 100, which may support iterative techniques to improve the efficiency of generating disparity maps is illustrated in FIG. 1. In one embodiment, the IPD 100 may include an image capturing device 110 and a processor 115. In one embodiment, the image capturing device 110 may include a camera system, which may capture images and send the images to the processor 115. In one embodiment, the image capturing device 110 may include a camera system, which may be equipped to render three dimensional (3-D) images. In one embodiment, the camera system may generate a left camera image and a right camera image for each image frame captured. In one embodiment, the left and right camera images may be provided to the processor 115.

In one embodiment, the processor 115 may include an interface logic 120, a disparity map estimator 125, a control logic 180, and an image processing logic 190. In one embodiment, the interface 120 may provide physical, electrical, and protocol related interface to support transfer of information between the processor 115 and the image capturing device 110 or any other device such as a display device. In one embodiment, the interface 120 may allow the left and right camera images to be transferred to the disparity map estimator 125.

In one embodiment, the disparity map estimator 125 may include a correspondence logic 130, disparity map refinement logic 150, and a joint bilateral up-sampling logic 170. In one embodiment, the correspondence logic 130 may receive the camera images (i.e., left and right images) and then generate an coarser disparity map. In one embodiment, the disparity may be caused by an offset of a projection of a pixel A in a right image (or left image) as compared to the projection of the pixel A in the left image (right image). A collection of such disparity points for each same real-world points may be referred to as a "disparity map". In one embodiment, the disparity of the same real-world pixel is briefly described in the line diagram of FIG. 2.

In one embodiment, an image 205 may include multiple real-world points and only one such real-world point 210 is depicted in the image 205 to illustrate disparity. A left image 220 may include a pixel 230, which may be a projection of the real-world point 210. A right image 270 may include a pixel 280, which may be a projection of the same real-world point 210. However, the position of the pixel 280 [i.e., $P_R(X_R, Y_R)$] in the right image 270 may not have the same X and Y coordinates [i.e., $P_L(X_L, Y_L)$] as that of the pixel 230 in the left image. In fact, a pixel 260 in the right image 270 may be a point corresponding to the position of the pixel 230 in the left image. The offset between the position of the pixel 260 and 280 may be referred to as disparity of the real-world point 210.

In one embodiment, the disparity vector pointing from $P_L$ (i.e., point 230) to point $P_R$ (i.e., point 280) is given as $d_L(P_L)=\{(X_R-X_L), (Y_R-Y_L)\}$. In one embodiment, for each pixel, its disparity $d_P$ is in a range of $[d_{min}, d_{max}]$. Likewise, each real-world point in the image 205 may have a disparity in the position of the projections in the left and right images 220 and 270. In one embodiment, the correspondence logic 130 may generate a coarser disparity map in response to receiving the left and right images 220 and 270. In one embodiment, the correspondence logic 130 may send a signal to the control logic 180 after generating the coarser disparity map. In one embodiment, the control logic 130 may determine whether to initiate the disparity map refinement logic 150 or the joint bilateral up-sampling logic 170.

In one embodiment, the disparity map refinement logic 150 may generate an intermediate disparity map in response to receiving the coarser disparity map (CDM). In one embodiment, the disparity map refinement logic 150 may define a disparity refinement region $[R(i, j)]$ for each pixel (i, j) in response to receiving the coarser disparity map. Then, in one embodiment, the disparity map refinement logic 150 may determine an initial matching cost $C_{int}(i, j, d)$ for each pixel (i, j) using varying size aggregation windows W (i, j, d). In one embodiment, the disparity map refinement logic 150 may then determine a final matching cost $C_{final}(i, j, d)$ for each pixel (i, j) using belief propagation technique. In one embodiment, the disparity map refinement logic 150 may then set the disparity for each pixel (i, j) to a value determined based on the final matching cost $C_{final}(i, j, d)$.

In one embodiment, the joint bilateral up-sampling logic 170 may generate a final disparity map in response to receiving the intermediate disparity map. In one embodiment, the joint bilateral up-sampling logic 170 may include a bilateral filter, which may generate the final disparity map based on the intermediate disparity map. In one embodiment, the joint bilateral up-sampling is described in further detail below.

Figures 3, 4:
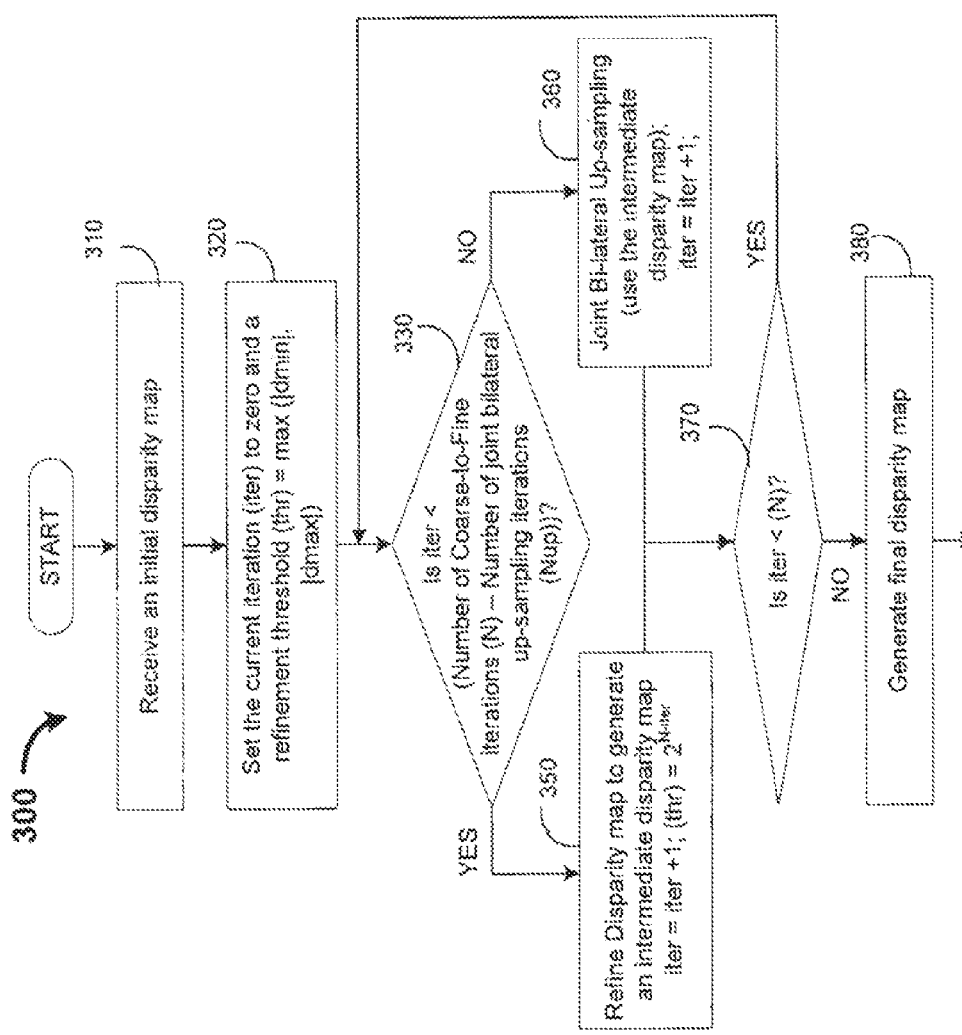
FIG. 3 is a flow-chart 300, which illustrates an operation of the IPD 200 in accordance with one embodiment.
FIG. 4 illustrates a flow-chart 400, which illustrates an operation of the IPD 200 while performing iterative techniques to improve efficiency of generating disparity maps in accordance with one embodiment.

A flow-chart 300 which illustrates an embodiment of an iterative technique used by the IPD 100 to improve efficiency of generating disparity maps is depicted in FIG. 3. In block 310, the disparity map refinement logic 150 may receive a coarser disparity map, which may be generated by the correspondence logic 130. In block 320, the control logic 180 may set the iteration (iter) to zero and a refinement threshold (thr) to a Max of $\{|d_{min}|, |d_{max}|\}$ in response to receiving a signal from the correspondence logic 130. In one embodiment, |dmin| may represent a minimum disparity value and |dmax| may represent a maximum disparity value. In one embodiment, the control logic 180 may cause the N iterations to occur before generating a final disparity map. In one embodiment, the control logic 180 may cause the disparity map refinement logic 150 to perform $N-N_{up}$ iterations after receiving the coarse disparity map (CDM). After $N-N_{up}$ iterations are complete, the control logic 180 may cause the joint bilateral up-sampling logic 170 to perform $N_{up}$ iterations. At the end of N iterations [$(N-N_{up})$ iterations performed by the disparity map refinement logic 150 and N iterations performed by the joint bilateral up-sampling logic 170], the disparity map estimator 105 may generate a final disparity map.

In block 330, the control logic 180 may determine if iteration 'iter' is less than a difference between N and $N_{up}$, wherein 'N' represents a number of coarse-to-fine iterations and '$N_{up}$' represents a number of joint bilateral up-sampling iterations. If the 'iter' is less than $(N-N_{up})$ control passes to block 350 and to block 360 if 'iter' is not less than $(N-N_{up})$.

In block 350, the disparity map refinement logic 150 may refine the coarser disparity map as described below to generate an intermediate disparity map and control passes to block 370. In block 360, the joint bilateral up-sampling logic 170 may perform bilateral filtering, which is described below and control passes to block 370.

In block 370, the control logic 180 may check if the 'iter' is less than 'N' and control passes to block 330 and to block 380 if the 'iter' is not less than 'N'. In block 380, the control logic 180 may generate a disparity map based on the disparity map generated by the disparity map refinement logic 150 (as in block 350) and the joint bilateral up-sampling logic 170 (as in block 360).

An embodiment 350 of the disparity map refinement logic 150 performing iterative techniques to improve efficiency of generating disparity maps is depicted in FIG. 4. In block 410, the disparity map refinement logic 150 may receive the coarse disparity map (CDM) and to refine the coarse disparity map at iteration 'iter' the disparity map refinement logic 150 may denote 'P' as a set of pixels ($2^{itr}.i, 2^{itr}.j$) in the coarser disparity map (CDM), where 'i'=0 . . . $\{[h/2^{itr}]-1\}$ and 'j'=0 ... $\{[w/2^{itr}]-1\}$, 'h' and 'w' are, respectively, the height and width of the reference image.

In block 420, the disparity map refinement logic 150 may define disparity refinement region R(i, j) for each pixel (i, j) of the set of pixels 'P' in the CDM. In one embodiment, the disparity map refinement logic 150 may define the refinement region R(i, j) as [max (CDM (i, j)–thr, $d_{min}$), min (CDM (i, j)+thr, $d_{max}$)], where parameter 'thr' depends on iteration number.

In block 440, the disparity map refinement logic 150 may determine an initial matching cost Cint (i, j, d) for each pixel (i, j) of the set 'P' in CDM based on the Equation (1) below. In one embodiment, the disparity map refinement logic 150 may include arithmetic and logic units to determine the initial matching cost Cint(i, j, d).

$$Cint(i, j, d) = \begin{cases} 1/|W(i, j, d)| \sum_{(x,y) \in W(i,j,d)} |I_r(x, y) - I_m(x+d, y)|, & \text{if } d <= i \text{ and } d \in R(i, j) \\ \max\_val, & \text{otherwise} \end{cases}$$ Equation (1)

wherein,
$d = d_{min} \ldots d_{max}$;
W(i, j, d) is a rectangular region [i: min (i+$2^{iter}$, h–1), (j: min (j+$2^{iter}$, w–1)];
h and w are, respectively, the height and width of the reference image;
Ir is the intensity of the reference image; and
Im is the intensity of the matching image.

For example, the left image and the right image may be, respectively, referred to as a reference image and matching image while determining the disparity map for the left image. Also, the right image and the left image may be, respectively, referred to as a reference image and matching image while determining the disparity map for the right image.

In block 460, the disparity map refinement logic 150 may determine the final matching cost $C_{final}$ (i, j, d) for each pixel (i, j) of the set 'P' in CDM using the Belief Propagation (BP) as described below. In one embodiment, the disparity map refinement logic 150 may include arithmetic and logic units to determine the final matching cost $C_{final}$(i, j, d).

In one embodiment, the disparity map refinement logic 150 may denote N(i, j) as a set of pixels $\{(i-2^{iter}, j), (l+2^{iter}, j), (i, j-2^{iter}), (i, j+2^{iter})\}$ within the set of pixels P. Then, in one embodiment, the disparity map refinement logic 150 may set initial messages for each pixel (i, j), which belongs to set P or N(l, k), where (l, k)∈P, and $d=d_{min} \ldots d_{max}$ to zero [i.e., $m^0$ (i, j, d)=0]. For each t=1 ... $N_{BP}$, the disparity map refinement logic 150 may determine messages $m^t\_$based on the Equation (2) below.

$$m^t_{(i',j')}(i, j, d) = \min_{d^\wedge \in [dmin \ldots dmax]} \begin{bmatrix} |d - d^\wedge| + C(i, j, d^\wedge) + \\ \sum_{(i'',j'') \in N(i,j) \setminus (i',j')} m^{t-1}_{(l,j)}(l'', j'', d^\wedge) \end{bmatrix}$$ Equation (2)

wherein (i, j)∈P, and (i', j')∈N (i, j), $d=d_{min} \ldots d_{max}$, $m^{t-1}$ represents the intermediate message.

After $N_{BP}$ iterations, for each (i, j) from the set P, matching cost may be defined as given in the Equation (3) below.

$$C_{final}(I, j, d) = C(I, j, d) + \sum_{(i',j') \in N(i,j)} m^{N_{BP}}_{(l',j')}(i, j, d)$$ Equation (3)

In block 470, the disparity map refinement logic 150 may define the disparity for each pixel (i, j) of the set 'P' in CDM as given by Equation (4) below.

$$\underset{d \in R(i,j)}{\operatorname{argmin}} C_{final}(i, j, d)$$ Equation (4)

In block 480, the disparity map refinement logic 150 may generate an intermediate disparity map by setting the disparity of each pixel (i, j) of the set 'P' in CDM as equal to disparity of the pixel, wherein $\hat{i} = \lfloor (i/2^{iter}) \rfloor$, and $\hat{j} = \lfloor (j/2^{iter}) \rfloor$.

In one embodiment, after the intermediate disparity map is generated, the joint bilateral up-sampling logic 170 may perform $N_{up}$ iterations to generate a final disparity map. In one embodiment, the joint bilateral up-sampling logic 170 may denote M as a set of pixels ($2^{iter}.i$, $2^{iter}.j$) in the intermediate disparity map, where 'i'=0 ... $\{[h/2^{itr}]-1\}$ and 'j'=0 ... $\{[w/2^{itr}]-1\}$, 'h' and 'w' are, respectively, the height and width of the reference image. For each pixel (i, j) of the set M, the final disparity map $D^{iter}$ may be refined by a bilateral filter. In one embodiment, the bilateral filter may be characterized by the Equation (5) below.

$$D^{iter}(i, j) = \\ 1/c(i, j) \sum_{(x,y) \in S(i,j)} (g(I_r(i, j) - I_r(x, y)) \cdot D^{iter}(x, y))$$ Equation (5)

wherein
$D^{iter-1}$ represents the intermediate disparity map generated by the disparity map refinement logic 150;
$g(x) = e^{-|x|^2/2\sigma^2}$ is a Gaussian kernel with σ=0.3;
'h' is the height of the input image;
'w' is the width of the input image; and
C(i, j) is a normalizing factor, the sum of 'g' filter weights.

In one embodiment, the bilateral filter may set the disparity of each pixel (i, j) to the disparity of the pixel, which may be equal to ($\lfloor (i/2^{iter}) \rfloor$, $\lfloor (j/2^{iter}) \rfloor$).

Figure 5:
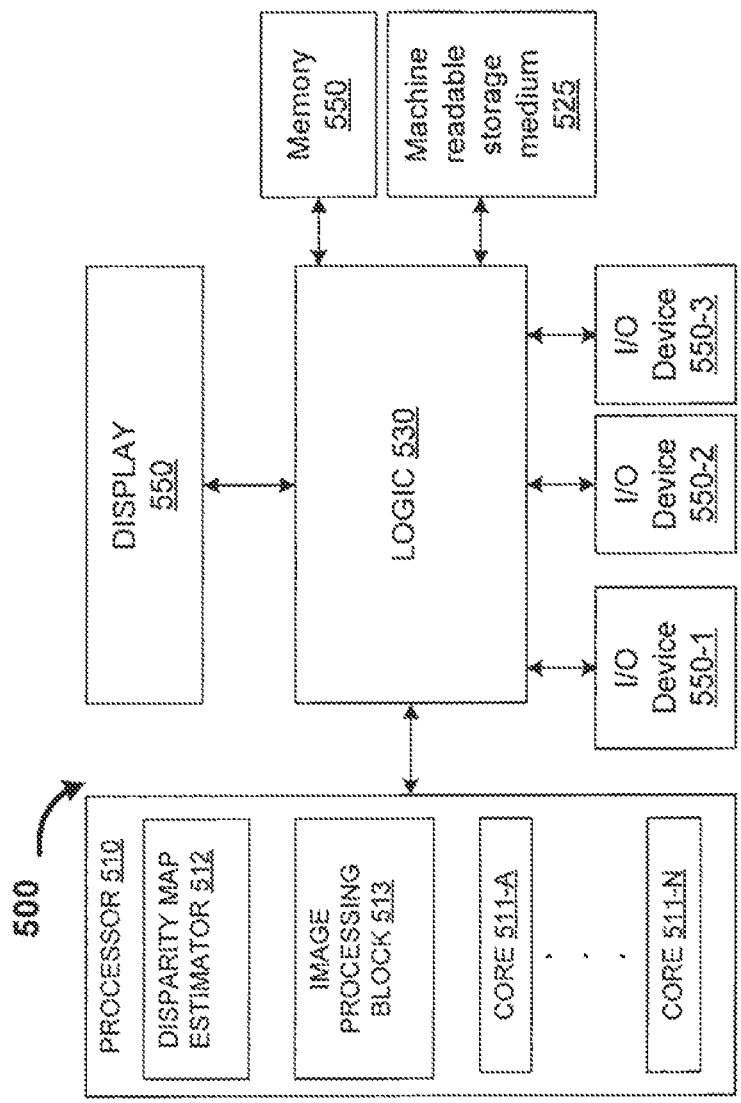
FIG. 5 illustrates a computer system 500, which may perform iterative techniques to improve efficiency of generating disparity maps in accordance with one embodiment.

An embodiment of a computer system 500 comprising a processor (comprising one or more processing cores), which may support iterative techniques to improve the efficiency of generating disparity maps is illustrated in FIG. 5. Referring to FIG. 5, the computer system 500 may include a general purpose processor (or CPU) 810 including a single instruction multiple data (SIMD) processor. In one embodiment, the CPU 810 may include multiple cores such as core 511-A to 511-N to support tasks performed by the image processing device 100 to perform iterations to improve the efficiency of generating disparity maps to aid rendering of 3-D images on display 590, which may include an autostereoscopic display. The CPU 510, in one embodiment, may perform iterative techniques to generate disparity map as described above to render 3-D images on an autostereoscopic display in addition to performing various other tasks or store a sequence of instructions, to perform iterative techniques to generate disparity map in a machine readable storage medium 525. However, the sequence of instructions may also be stored in the memory 550 or in any other suitable storage medium.

The processor or CPU 510 that operates the computer system 500 may be coupled to logic 530. The logic 530 may be coupled to one or more I/O devices 560 such as image capturing device 110, which may provide interface the computer system 500. The logic 530, for example, could be a chipset logic in one embodiment. The logic 530 may be coupled to the memory 550 or a machine readable storage device 525, which can be any kind of storage, including optical, magnetic, or semiconductor storage.

In one embodiment, the cores 511 of the CPU 510 may perform disparity map refinement tasks, back propagation tasks, joint bilateral up-sampling tasks and such other tasks. In one embodiment, the other graphics processing tasks may be performed by the image processing logic 513 and such other graphics processing tasks may include tasks such as pre-processing of depth map, 3D wrapping, and hole-filling or post-processing phase to fill the exposed holes. In one embodiment, one or more cores, together or individually, may support such iterative techniques. In one embodiment, the core 511-A may support disparity map refinement tasks and joint bilateral up-sampling tasks performed by the disparity map estimator 512, for example.

In one embodiment, the disparity map estimator 512 may perform an iterative technique to improve the efficiency of generating disparity map. In one embodiment, the disparity map estimator 512 may perform disparity map refinement using size varying aggregation windows during the first (or initial) iterations as compared to, for example, generating low resolution stereo images (from the original image) during the initial iterations. In one embodiment, disparity map estimator 512 may use larger or bigger size aggregation windows during the initial iterations to perform disparity map refinement. Further, the disparity map estimator 512 may use joint bilateral up-sampling during the second (or last) iterations.

In one embodiment, using a combination of varying size aggregation windows during the initial iterations and a joint bilateral up-sampling during the second iterations may reduce the computational complexity and memory requirements. In one embodiment, the combination of using varying size aggregation windows and joint bilateral up-sampling to refine the disparity map may reduce the high resolution of the images to a level acceptable for real-time processing and may further reduce the number of incorrect matches.

The graphics processing techniques described herein may be implemented in various hardware architectures. For example, graphics functionality may be integrated within a chipset. As still another embodiment, the graphics functions may be implemented by a general purpose processor, including a multi-core processor or as a set of software instructions stored in a machine readable medium.

What is claimed is:

1. A method in a processor, comprising:
receiving a coarse disparity map;
generating an intermediate disparity map from the coarse disparity map by performing a first number of refinement iterations on the coarse disparity map, wherein a pixel from the coarse disparity map is selected for each iteration based on iteration number and height and width of a reference image, wherein the refinement iterations are performed using an aggregation window for each of the selected pixels, wherein size of the aggregation window varies per selected pixel; and
generating a final disparity map from the intermediate disparity map by performing a second number of joint bilateral up-sampling iterations on the intermediate disparity map, wherein a pixel from the intermediate disparity map is selected for each iteration based on the iteration number and the height and the width of the reference image.

2. The method of claim 1, wherein an iteration of the first number of refinement iterations for generating the intermediate disparity map includes:
defining a disparity refinement region for the selected pixel,
determining an initial matching cost for the selected pixel using the disparity refinement region,
determining a final matching cost for the selected pixel based on the initial matching cost, and
determining a disparity value for the selected pixel based on the final matching cost.

3. The method of claim 2, wherein the defining the disparity refinement region includes defining the disparity refinement region based on a disparity range.

4. The method of claim 2, wherein the determining the initial matching cost includes determining the initial matching cost based on a rectangular aggregation region around the selected pixel.

5. The method of claim 4, wherein the rectangular aggregation region is based on the iteration number and the height and the width of the reference image.

6. The method of claim 4, wherein the determining the initial matching cost includes determining the initial matching cost based on intensity values of the reference image and a matching image.

7. The method of claim 2, wherein the determining the final matching cost includes determining the final matching cost using belief propagation.

8. The method of claim 1, wherein the second number of joint bilateral up-sampling iterations is performed after the first number of refinement iterations is complete.

9. The method of claim 1, wherein the performing the joint bilateral up-sampling includes performing the joint bilateral up-sampling using a bilateral filter.

10. The method of claim 9, wherein the performing the joint bilateral up-sampling using the bilateral filter includes performing the joint bilateral up-sampling with a Gaussian kernel.

11. A processor to generate a disparity map, comprises:
an interface;
a disparity map estimator to:
receive a coarse disparity map;
generate an intermediate disparity map from the coarse disparity map by performing a first number of refinement iterations on the coarse disparity map, wherein a pixel from the coarse disparity map is selected for each iteration based on iteration number and height and width of a reference image, wherein the refinement iterations are performed using an aggregation window for each of the selected pixels, wherein size of the aggregation window varies per selected pixel; and
generate a final disparity map from the intermediate disparity map by performing a second number of joint bilateral up-sampling iterations on the intermediate disparity map, wherein a pixel from the intermediate disparity map is selected for each iteration based on the iteration number and the height and the width of the reference image; and an image processing logic to perform graphics processing tasks.

12. The processor of claim 11, wherein the disparity map estimator includes a disparity map refinement logic to generate the intermediate disparity map, wherein for an iteration of the first number of refinement iterations the disparity refinement logic is to:
define a disparity refinement region for the selected pixel;
determine an initial matching cost for the selected pixel using the disparity refinement region;
determine a final matching cost for the selected pixel based on the initial matching cost; and
determine a disparity value for the selected pixel based on the final matching cost.

13. The processor of claim 12, wherein the disparity map refinement logic is to determine the disparity refinement region based on a disparity range.

14. The processor of claim 12, wherein the disparity map refinement logic is to determine the initial matching cost based on a rectangular aggregation region around the selected pixel.

15. The processor of claim 14, wherein the disparity map refinement logic is to define the rectangular aggregation region based on the height and the width of the reference image.

16. The processor of claim 14, wherein the disparity map refinement logic is to determine the initial matching cost for the one of the plurality of pixels based on intensity values of the reference image and a matching image.

17. The processor of claim 12, wherein the disparity map refinement logic is to determine the final matching cost using belief propagation.

18. The processor of claim 11, wherein the disparity map estimator includes a joint bilateral up-sampling logic to perform the second number bilateral filtering iterations after the first number of refinement iterations is complete.

19. The processor of claim 11, wherein the joint bilateral up-sampling logic includes a bilateral filter to perform the joint bilateral up-sampling.

20. The processor of claim 19, wherein the bilateral filter includes a Gaussian kernel.

21. A computer system to generate a disparity map, comprises:
a logic;
a memory;
a display;
a machine readable medium;
a plurality of input-output devices; and
a processor, the processor including a disparity map estimator to:

generate an intermediate disparity map from the coarse disparity map by performing a first number of refinement iterations on the coarse disparity map, wherein a pixel from the coarse disparity map is selected for each iteration based on iteration number and height and width of a reference image, wherein the refinement iterations are performed using an aggregation window for each of the selected pixels, wherein size of the aggregation window varies per selected pixel; and generate a final disparity map from the intermediate disparity map by performing a second number of joint bilateral up-sampling iterations on the intermediate disparity map, wherein a pixel from the intermediate disparity map is selected for each iteration based on the iteration number and the height and the width of the reference image.

22. The computer system of claim 21, wherein the disparity map estimator is further to for an iteration of the first number of refinement iterations:
define a disparity refinement region for the selected pixel;
determine an initial matching cost for the selected pixel using the disparity refinement region;
determine a final matching cost for the selected pixel based on the initial matching cost; and
determine a disparity value for the selected pixel based on the final matching cost.

23. The computer system of claim 22, wherein the disparity map estimator is to determine the disparity refinement region based on a disparity range.

24. The computer system of claim 22, wherein the disparity map estimator is to determine the initial matching based on a rectangular aggregation region around the selected pixel.

25. The computer system of claim 24, wherein the disparity map estimator is to define the rectangular aggregation region based on the height and the width of the reference image.

26. The computer system of claim 24, wherein the disparity map estimator is to determine the initial matching cost based on intensity values of the reference image and a matching image.

27. The computer system of claim 22, wherein the disparity map estimator is to determine the final matching cost using belief propagation.

28. The computer system of claim 22, wherein the disparity map estimator is to perform the second number of bilateral up-sampling iterations after the first number of refinement iterations is complete.

29. The computer system of claim 21, wherein the disparity map estimator is to perform the bilateral up-sampling using a bilateral filter.

30. The computer system of claim 29, wherein the bilateral filter includes a Gaussian kernel.

* * * * *